Oct. 25, 1938.   W. VAN E. THOMPSON   2,134,382
QUICK COUPLING VALVE
Filed April 20, 1936
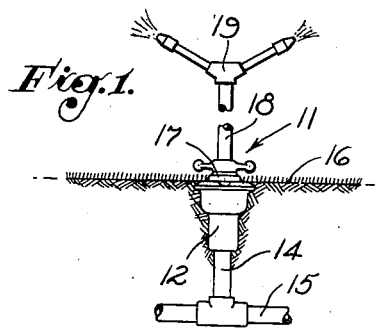
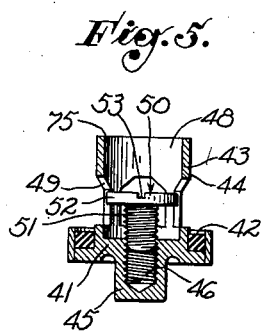
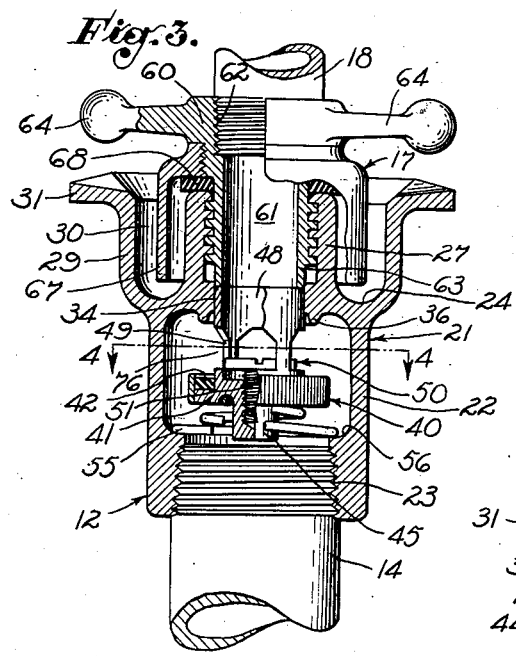
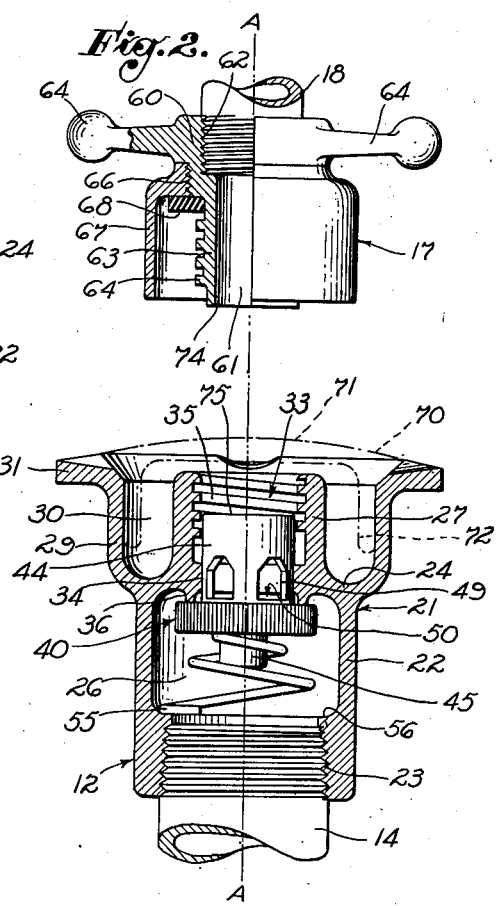
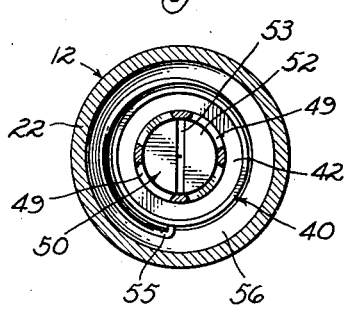
INVENTOR
WALTER VAN E. THOMPSON
BY
ATTORNEY.

Patented Oct. 25, 1938

2,134,382

UNITED STATES PATENT OFFICE 2,134,382

QUICK COUPLING VALVE

Walter Van E. Thompson, Los Angeles, Calif., assignor to Thompson Manufacturing Company, Los Angeles, Calif., a corporation of California Application April 20, 1936, Serial No. 75,297

3 Claims. (Cl. 284—19)

My invention relates to the sprinkler art and particularly concerns a quick coupling valve for use in sprinkler systems where the irrigation sprinklers can not be left protruding above the surface of the ground, for example, in playgrounds, golf courses, and the like, where any protruding sprinkler would interfere with the use of such property.

Quick coupling valves or quick coupling devices, as they are sometimes called, are in general use and consist essentially of a stationary or permanent part which is usually located below the surface of the ground and is connected to the water supply. The quick coupling device also includes a removable part to which the sprinkler unit is connected. When it is desired to employ a sprinkler, the removable part is secured to the permanent part, and in so doing a valve in the permanent part is opened, thus allowing water to flow through the permanent part and the removable part to the sprinkler unit, by means of which it is distributed over the surrounding area.

It is an object of my present invention to provide a quick coupling device or quick coupling valve suitable for use as designated above which is an improvement over the prior art by reason of its extreme simplicity and dependability.

It is a further object of my invention to provide a quick coupling device in which the removable part may be very quickly installed and removed from the permanent or stationary part.

A further object of my invention is to provide a device of the character mentioned in which the amount of water which flows through the sprinkler may be readily controlled by the adjustment of a control valve forming a part of the stationary part or section of the quick coupling device.

It is another object of my invention to provide a device of the character mentioned in the preceding paragraph in which the means for adjusting the capacity of the sprinkler is accessible from the exterior and may be readily adjusted while the removable part is removed from place.

It is a further object of my invention to provide a quick coupling device which has a simplified form of valve which includes the means for regulating the flow of water through the device.

It is a further object of my invention to provide a valve construction constituting a new article of manufacture.

Other objects and advantages of my invention are contained in certain unique arrangements of parts and details of construction, and will be referred to during the course of the following description of a preferred form of my invention.

Referring to the accompanying drawing:

Fig. 1 is a fragmentary view illustrating the utility of my invention.

Fig. 2 is a vertical sectional view through the quick coupling device of my invention showing the permanent part and removable part in positions ready to be secured together.

Fig. 3 is a sectional view similar to Fig. 2 showing the permanent part and removable part of my invention in fully assembled position and with the valve thereof in open position.

Fig. 4 is a section taken on the line 4—4 of Fig. 3.

Fig. 5 is a sectional view showing the valve of my invention.

Referring to the drawing in detail, and particularly Fig. 1, the numeral 11 is used to designate the quick coupling device of my invention. This device 11 includes a permanent part 12 which is threadedly connected to a riser pipe 14, which is in turn connected to a horizontal header 15, by means of which water is supplied to the quick coupling device. As illustrated, the permanent part or section of the quick coupling device is situated so that it is flush or slightly below the surface of the ground indicated at 16. Adapted to be connected to the permanent part or section 12 is a removable part or section 17 which in Fig. 1 is shown secured in place. Extending upward from the removable part 17 is a vertical supply pipe 18, and connected to the upper end thereof is a sprinkler unit 19 which may be of any suitable construction, preferably a rotating type of sprinkler which will deliver water to a circular area surrounding the sprinkler.

As shown in Fig. 3, the permanent part or section 12 is in the form of a body 21 which provides a cylindrical wall 22 which is threaded at 23 to receive the upper end of the riser 14. Projecting inwardly at the upper end of the cylindrical wall 22 is an end wall 24 which cooperates with the cylindrical wall 22 to define a valve chamber 26. Projecting upwardly from the end wall 24 is a cylindrical projection 27, and projecting upwardly from the cylindrical wall 22 is a rim 29 which is of larger diameter than the cylindrical wall 22 and which provides an annular pocket 30 between itself and the cylindrical projection 27. The upper end of the rim 29 is provided with an outwardly extending flange 31 which rests at or below the surface of the ground 16, as indicated in Fig. 1.

The cylindrical projection 27 has a cylindrical outlet opening 33 formed through it, at the lower end of which is provided a cylindrical guide wall 34, and the upper part of which is provided with internal threads 35. Depending from the end wall 24 and surrounding the cylindrical opening 33 is a valve seat 36.

Supported by the body 21 is a valve, generally designated by the numeral 40, which incorporates important features of my invention. The valve 40 is provided in the form of a body 41 which is in the form of a relatively thin cylinder which carries an upwardly exposed packing ring 42 which is adapted to engage the valve seat 36, as shown in Fig. 2. Projecting upwardly from the body 41 of the valve 40 is a cylindrical wall or guide sleeve 43 which has an outer cylindrical surface 44 which is preferably of a relatively close fit in the guide wall 34 so that the cooperation between these parts serves as a guide means for guiding the valve 40 through its proper positions, as will be explained. Depending from the body 41 is a lug or projection 45, and formed in the body 41 and projection 45 from the upper end thereof is a threaded hole 46. The guide sleeve 43 provides a cylindrical passage 48 which is open at its upper end and which has the lower part thereof connected to the exterior of the sleeve 43 through apertures 49. For the purpose of controlling the effective size of these apertures 49 I provide a regulating means or flow control means 50. This means 50 is, as shown, in the form of a screw having a threaded portion 51 which is threadedly disposed in the threaded hole 46 and a cylindrical head 52 which is preferably of substantially the same diameter as the cylindrical opening 48. The position of the screw may be adjusted by applying a screw driver to a groove 53 and suitably rotating same. It will be seen that the effective sizes of the apertures 49 are controlled by the vertical position of the cylindrical head 52, the higher the head 52, the smaller the effective sizes of the apertures 49, and vice versa.

As shown best in Fig. 2, the valve 40 is so mounted that the body 41 and projection 45 are positioned within the valve chamber 26, and the guide sleeve 43 is positioned in the cylindrical opening 33. The valve 40 is normally held in a closed position by means of a spring 55, the upper end of which engages the lower face of the body 41, and the lower end of which engages an annular shoulder 56 provided by the cylindrical wall 22 at the lower end of the valve chamber 26.

The removable part or removable section 17 is provided in the form of a body 60 providing a central passage 61, the upper end of which is threaded at 62 to receive the vertical pipe 18. The upper part of the body 60 is also provided with arms 64 whereby the body may be manually rotated to attach or detach the removable section. The lower part of the body 60 is provided in the form of a threaded projection 63 having threads 64 which mate with the threads 35. At the upper end of the threaded projection 63 there is a threaded enlargement 66 to which a depending skirt 67 is threadedly secured. This depending skirt 67 extends downwardly around the threaded projection 63 and is spaced therefrom. Within the skirt 67 and at the upper end of the threaded projection 63 is a seat 68 adapted to form a seal with the upper end of the cylindrical projection 27 when the removable part is secured in place.

When the permanent part of the quick coupling device is not in use the upper end thereof is closed by means of a cover designated by dotted lines 70 in Fig. 2. This cover, it will be noted, has an upper rounded wall 71 and a depending cylindrical wall 72 which fits downwardly within the rim 29 of the permanent part 12. This cover 70 completely closes the permanent part and prevents any injury thereto and prevents foreign matter from getting into the annular space 30 or the cylindrical opening 33.

When it is desired to irrigate the area surrounding this permanent part 12, the cover 70 is removed and the removable part is moved into a position as shown in Fig. 2. The removable part is then lowered so that the threaded projection 63 engages the upper end of the cylindrical projection 27. The removable part is then rotated so that the threads 64 and 35 engage each other and by such rotation the removable part is advanced downwardly into an assembled position as shown in Fig. 3. It will be seen that as the removable part is advanced downwardly the lower end or end face 74 of the threaded projection engages the upper end or upper end face 75 of the guide sleeve 43, and by reason of this contact as the removable part moves downwardly the valve 40 is moved downwardly against the action of the spring 55. It will be seen that as the valve 40 is moved downwardly it is first disengaged from the valve seat 36, and thereafter the apertures 49 are brought into communication with the valve chamber 26 through the annular opening 76 which is formed between the body 41 and the valve seat 36. At this time water is free to flow through the valve chamber 26, the apertures 49, the cylindrical passage 48, the passage 61, and then through the pipe 18 and sprinkler 19 onto the area over which the water is to be distributed.

The valve is guided through the positions shown in Figs. 2 and 3 by the cooperation of the guide wall 34 and the guide face 44 of the guide sleeve 43. These two walls cooperate to maintain the valve 40 concentric to the vertical axis or center line of the permanent part 12 which is designated by the line A—A in Fig. 2. When the valve is completely opened, as shown in Fig. 3, the upper continuous part of the guide wall 44 is in complete annular engagement with the guide wall 34 and not only supports the valve 40 in proper concentric position but does not in any way interfere with the flow of water through the apertures 49.

The amount of water which flows through the sprinkler when the removable part 17 is secured in place is determined by the regulating means 50. It will be seen that when the regulating means is in the position shown in Fig. 3 there is a substantial maximum flow through the sprinkler. However, if the regulating means is adjusted so that the cylindrical head 52 thereof rests in the position shown in Fig. 5, the capacity of the sprinkler will have been substantially reduced, since the effective sizes of the apertures 49 have been reduced.

As will be seen from an inspection of Fig. 2, when the removable part is removed from place and the cover 70 is also removed from place, it is very easy to engage the regulating means 50 by means of a screw driver and to rotate same either to advance the regulating means upward or downward in order to decrease or increase the volume of flow of water as desired. In this way it is very easy to get the desired flow of water through the sprinkler unit, which in turn controls the area which is covered by the sprinkler 19 and also the amount of irrigation. This feature will be looked upon as quite valuable when it is considered that since the permanent parts 12 are located in different positions in horizontal headers 52 that the pressure head at each of the permanent parts is different. Therefore, in order to obtain the same amount of irrigation surrounding each sprinkler it is necessary to have a different adjustment of the regulating means 50 in order that the difference in pressure head may be individually compensated for at each individual permanent part.

In installing the removable part the skirt 67 prevents water from flying from the quick coupling device should there be any leakage between the threads 35 and 64. When the removable part is in fully assembled position, the seat 68 engages the upper end of the threaded projection 27 and thus effectively prevents leakage.

In removing the removable part from the permanent part the removable part is rotated in the opposite direction, and as the threaded projection 63 is advanced upwardly from the cylindrical projection 27 the spring 55 moves the valve 40 upwardly until it reaches the position shown in Fig. 2, at which time the valve seat 36 is engaged and there will be no further flow of water through the device. The removable part is then fully removed, the cover 70 installed in place, and if desired, the removable part 17 with the pipe 18 and sprinkler 19 may be moved to a different locality for further use in connection with some other permanent part.

From the foregoing description it will be seen that the quick coupling device of my invention is of extremely simple construction. It consists essentially of three main parts, the permanent part, the removable part, and the valve. The valve in turn consists of two essential parts, the body and associated construction, and the regulating means 50. The valve as a whole constitutes a very important part of my invention, and by reason of its design enables a very simple form of quick coupling device to be produced which is of low cost and dependable in service, and which at the same time permits a ready regulation to obtain the desired distance and quantity of irrigation.

In the preceding description and in the drawing I have described and illustrated the preferred form of my invention. It should be readily understood, however, that various modifications and alterations may be made without departing from the spirit and scope of my invention which should be determined by the appended claims taken in conjunction with the statement of invention and description and illustration of the preferred form of my invention.

I claim as my invention:

1. In a coupling device of the class described the combination of: a permanent section adapted to be connected to a supply means; a removable section adapted to be connected to said permanent section; a closure valve in said permanent section; means for opening said closure valve a fixed distance; and adjustable flow restricting means mounted on the exhaust side of said closure valve, said flow restricting means having a wall which is adjustable in position relative to said closure valve which engages the flow of fluid passing the exhaust side of said closure valve and regulating the flow of fluid through said coupling device.

2. In a coupling device of the class described the combination of: a permanent section adapted to be connected to a supply means; a removable section adapted to be connected to said permanent section; a closure valve in said permanent section; means for opening said closure valve; and adjustable flow restricting means mounted on the exhaust side of said closure valve, said flow restricting means having a wall which engages the flow of fluid passing the exhaust side of said closure valve and regulating the flow of fluid through said coupling device, said flow restricting means having a part engageable from the exterior when said removable section is detached from said permanent section, the movement of said part accomplishing the adjustment of said flow restricting means.

3. In a coupling device of the class desribed the combination of: a permanent section adapted to be connected to a supply means; a removable section adapted to be connected to said permanent section; a closure valve in said permanent section and having a guide member on the exhaust side thereof cooperating with said permanent part for guiding said closure valve, said guide member having a passage through which liquid may flow when said valve is in an open position; means for opening said closure valve; and regulating means, which is exposed when said removable section is detached from said permanent section, carried by said closure valve for regulating the flow of liquid through said passage.

WALTER VAN E. THOMPSON.